United States Patent
Sato

(10) Patent No.: US 7,401,043 B2
(45) Date of Patent: Jul. 15, 2008

(54) METHOD AND SYSTEM FOR ISSUING SECURITIES AND FIXED RATE FINANCING INSTRUMENTS, METHOD FOR ESTABLISHING A MARKET WITH THE SYSTEM

(76) Inventor: Michihiro Sato, 12-7-2-082, Gobancho, Chiyoda-ku, Tokyo (JP) 102-0076

( * ) Notice: Subject to any disclaimer, the term of this patent is extended or adjusted under 35 U.S.C. 154(b) by 252 days.

(21) Appl. No.: 11/149,556

(22) Filed: Jun. 10, 2005

(65) Prior Publication Data

US 2005/0251467 A1 Nov. 10, 2005

Related U.S. Application Data

(63) Continuation-in-part of application No. 10/444,870, filed on May 23, 2003, and a continuation-in-part of application No. 10/376,358, filed on Feb. 27, 2003, and a continuation-in-part of application No. 10/358,432, filed on Feb. 4, 2003, and a continuation-in-part of application No. 10/233,995, filed on Aug. 30, 2002.

(51) Int. Cl.
*G06Q 40/00* (2006.01)
(52) U.S. Cl. ................ 705/36 R; 705/37; 235/379; 235/381
(58) Field of Classification Search ............ 705/35, 705/36 R, 38, 37; 235/379–381
See application file for complete search history.

(56) References Cited

U.S. PATENT DOCUMENTS 5,765,141 A 6/1998 Spector

| | | |
|---|---|---|
| 6,073,120 A | 6/2000 | Shiota et al. |
| 6,208,978 B1 * | 3/2001 | Walker et al. .......... 705/38 |
| 6,233,565 B1 | 5/2001 | Lewis et al. |

(Continued)

FOREIGN PATENT DOCUMENTS

JP 11-86101 9/1997

(Continued)

OTHER PUBLICATIONS

"Big News Gets Low-Key Treatment from Citibank; Direct Mail Carries Message of Expanded ATM Investment Service", Bank Advertising News, vol. 19, No. 6, Nov. 28, 1994, p. 3.

(Continued)

*Primary Examiner*—Hani Kazimi
*Assistant Examiner*—Stefano Karmis
(74) *Attorney, Agent, or Firm*—Reed Smith LLP; Stanley P. Fisher, Esq.; Juan Carlos A. Marquez, Esq.

(57) ABSTRACT

An issuing system for a newly-issued security or fixed rate financing instrument includes a server and a plurality of issuing machines connected to the server via a network. Each of the issuing machines receives an ID recording medium provided by a potential purchaser, retrieves an identification recoded in the received ID recording medium, requests the potential purchaser to input request for a transaction of the security or fixed rate financing instrument, processes the requested transaction by retrieving information via a network from the server, and prints out on demand a hardcopy of the security or fixed rate financing instrument as purchased by the potential purchaser. A method for forming a new market with the issuing system.

3 Claims, 9 Drawing Sheets

U.S. PATENT DOCUMENTS

| | | | |
|---|---|---|---|
| 6,575,362 B1 * | 6/2003 | Bator et al. | 235/381 |
| 6,874,682 B2 | 4/2005 | Utz et al. | |
| 6,901,382 B1 | 5/2005 | Richards et al. | |
| 2002/0107766 A1 | 8/2002 | Sioufi | |

FOREIGN PATENT DOCUMENTS

| | | |
|---|---|---|
| JP | 2002-24730 | 7/2000 |
| JP | 2002-24738 | 7/2000 |
| JP | 2002-163449 | 11/2000 |
| JP | 2003-118276 | 10/2001 |

OTHER PUBLICATIONS

Giesen, Lauri, "How Buck Rogers is Bailing Out ATMs", Banking Management V68n11, Nov. 1992, p. 65.

"Japanese Banks Decide to Open ATMs to Securities Firms", Comline-Tokyo Financial Wire, Jul. 11, 1997, 1 page.

Power, Carol, "On-Line Banking: New NCR Offerings Link Back Office, Front End", American Banker, May 15, 1997, p. 16.

* cited by examiner 21A, 22B

Fig. 10

| Securities Identification | 20040404 | | | | | 20030201 | | | | | 20001025 | | | | |
|---|---|---|---|---|---|---|---|---|---|---|---|---|---|---|---|
| Name of Public Work | ODAIBA CASINO | | | | | NUMAZU MUNICIPAL HOSPITAL | | | | | SAITAMA STATION FRONT BUILDING | | | | |
| Face Value (Million yen) | 100 | 50 | 10 | 5 | 1 | 100 | 50 | 10 | 5 | 1 | 100 | 50 | 10 | 5 | 1 |
| Contents of Public Work | Construction of casino in Odaiba and its operation | | | | | Construction of municipal hospital in Numazu and its operation | | | | | Construction of building in front of Saitama station and its operation | | | | |
| Planner | Japan Gov | | | | | South Korea Gov | | | | | China Gov | | | | |
| Executor | The Metropolis of Tokyo and some management company in Las Vegas | | | | | Numazu City | | | | | Saitama City | | | | |
| Guarantor | United States Gov | | | | | Japan Gov | | | | | China Gov | | | | |
| Redemption Period | 10 years | | | | | 5 years | | | | | 8 years | | | | |
| Interest Rate (Annual) | 3% | | | | | 2% | | | | | 2.5% | | | | |
| Guaranteed Limit | 70% | | | | | 80% | | | | | 80% | | | | |
| Dividend | None | | | | | None | | | | | None | | | | |
| Comment of Related Parties | Comment from the Governor of Tokyo | | | | | Comment from the Mayor of Numazu | | | | | Comment from the Mayor of Saitama | | | | |

Fig. 11

| Securities Identification | 20020401 | | | | | 20020938 | | | | | 20060825 | | | | |
|---|---|---|---|---|---|---|---|---|---|---|---|---|---|---|---|
| Name of Public Work | JAPANESE HIGHWAY | | | | | STOMACH CANCER SUPPRESSANT DEVELOPMENT PROJECT | | | | | XX SATELLITE PROJECT | | | | |
| Face Value (Million yen) | 100 | 50 | 10 | 5 | 1 | 100 | 50 | 10 | 5 | 1 | 100 | 50 | 10 | 5 | 1 |
| Contents of Public Work | Operation of Tomei Highway | | | | | Development of stomach cancer suppressant | | | | | Launching and operation of XX satellite | | | | |
| Planner |  | | | | | Japan | | | | | Japan / National Space Development Agency | | | | |
| Executor | Japan Highway Public Corporation | | | | | Takeda Chemical Industries, Ltd. | | | | | National Space Development Agency | | | | |
| Guarantor | Japan Gov | | | | | Japan / UFJ Bank | | | | | Japan / Mitsubishi Heavy Industries, Ltd. | | | | |
| Redemption Period | None | | | | | 10 years | | | | | 6 years | | | | |
| Interest Rate (Annual) | 3% | | | | | 2.5% | | | | | 2% | | | | |
| Guaranteed Limit | 60% | | | | | 50% | | | | | 85% | | | | |
| Dividend | Yes | | | | | None | | | | | None | | | | |
| Comment of Related Parties | Comment from the Prime Minister of Japan | | | | | Comment from the President of Takeda Chemical Industries, Ltd. | | | | | Comment from National Space Development Agency and Director of the Science and Technology Agency | | | | |

Fig. 12

| Securities Identification | 20100962 | | | | | 20904829 | | | | |
|---|---|---|---|---|---|---|---|---|---|---|
| Name of Public Work | YY Oil Field Project | | | | | ZZ Natural Gas Project | | | | |
| Face Value (Million yen) | 100 | 50 | 10 | 5 | 1 | 100 | 50 | 10 | 5 | 1 |
| Contents of Public Work | Development and Management of YY Oil Field | | | | | Development and Management of ZZ Natural Gas | | | | |
| Planner | Japan / Russia / Gulf Oil Co. | | | | | Japan / Canada / Occidental Oil Co. | | | | |
| Executor | Gulf Oil Co. | | | | | Occidental Oil Co. | | | | |
| Guarantor | Japan / Russia Govs | | | | | Japan / Canada Govs | | | | |
| Redemption Period | 10 years | | | | | 9 years | | | | |
| Interest Rate (Annual) | 5% | | | | | 2.5% | | | | |
| Guaranteed Limit | 70% | | | | | 65% | | | | |
| Dividend | None | | | | | None | | | | |
| Comment of Related Parties | Comment from the President of Russia | | | | | Comment from the President of Canada | | | | |

METHOD AND SYSTEM FOR ISSUING SECURITIES AND FIXED RATE FINANCING INSTRUMENTS, METHOD FOR ESTABLISHING A MARKET WITH THE SYSTEM

CROSS-REFERENCE TO RELATED APPLICATION

This application is a Continuation-in-Part application of U.S. application Ser. Nos. 10/233,995 filed on Aug. 30, 2002, 10/358,432 filed on Feb. 4, 2003, 10/376,358 filed on Feb. 27, 2003 and 10/444,870 filed on May 23, 2003, Priority is claimed based on the parent U.S. application Ser. Nos. 10/233,995 filed on Aug. 30, 2002, 10/358,432 filed on Feb. 4, 2003 and 10/376,358 filed on Feb. 27, 2003 and 10/444,870 filed on May 23, 2003, which claim the priority dates of Sep. 3, 2001, Feb. 5, 2002, Feb. 27, 2002, Mar. 11, 2002, May 31, 2002, Sep. 3, 2002 and Feb. 4, 2003, the filing dates of Japanese Patent Application Nos. 2001-265178, 2002-27550, 2002-51085, 2002-65123, 2002-158595, 2002-257497 and 2003-27127, respectively.

BACKGROUND OF THE INVENTION

1. Field of the Invention

The present invention relates to an issuing system including a plurality of issuing machines for selling, generating, and printing newly-issued securities or fixed rate financing instruments that include selected features of common stock and bonds, and a method for establishing a market with the system. In particular, the fixed rate financing instruments attract private funds and investments to finance public works or projects, such as infrastructure improvement projects.

2. Description of the Prior Art

Stock certificates are a well-known type of certificate of securities that represent the positions or rights of stockowners. A business operator issues stock certificates that represent the positions or rights of investors in return for acquiring funds from the investors. Those who purchased stock certificates (i.e., stockholders) are allowed to participate in the operation of the company that issued the stock certificates based on the positions and rights given to them in return. In other words, stockholders can attend stockholders meetings, participate in voting, and demand dividends from the company that issued stock certificates.

Moreover, stockholders are allowed to sell the stock certificates to third parties. By selling the stocks at prices exceeding the original purchase prices, they can earn profits that are equal to the differences between them.

Bonds are another type of well-known securities that are issued by national or local governments, entities established based on special laws, or private enterprises for obligations they have to the public as a whole. Bonds are characterized in that they have predetermined redemption dates, after which the bond issuers are to pay to the bond owners corresponding principals and interests. Bond owners are also allowed to sell bonds at prices exceeding the original purchase prices and earn profits that are equal to the differences between them.

However, a business operator sometimes may not be able to acquire sufficient funds only by stock issues. Moreover, by issuing bonds, a business operator becomes obligated to pay the principals and interests after the redemption dates, so that bond issuing results in a high burden for a business owner.

US. Patent Application Publication No. 20020107766 provides a financial instrument certificate purchasing system for issuing, transferring and redeeming financial certificates which are representative of underlying publicly-traded property. The system permits an individual to gift a third party with a certificate which represents a company's security or other financial instrument, while not itself consisting of the financial instrument. However, the system does not sell, generate or print the financial instrument itself. In addition, the certificates are ordered via a personal computer, rather than any publicly-available standing-alone issuing machine like an ATM.

There is a need for a securities issuing system with a plurality of issuing machines placed at various convenient locations to for potential customers to offer to buy securities, to buy securities, to transfer bought securities to a depository, or to print out the bought securities.

SUMMARY OF THE INVENTION

It is a purpose of this invention to provide a system with a plurality of issuing machines placed at various convenient locations to for potential customers to offer to buy securities, to buy securities, to transfer bought securities to a depository, or to print out the bought securities.

The system of the present invention comprises a novel method of issuing a new financial product different, from stocks and bonds, that will provide investors who trade stocks and bonds with a new chance of earning profits by creating and marketing a financial instrument that provides for partial guarantee of a security by a third party.

Therefore, an intension of the present invention is to provide a securities issuing system for issuing bonds for obtaining funds from private sectors to promote investments in public works projects for improving infrastructures even in a society under a depressed financial situation, as well as a new market forming method that enables the bonds issued by the securities issuing system to be marketed.

Another intention of the present invention is to provide a securities issuing system for issuing bonds, which does not specify the redemption date although the dividend, interest and guaranty are stated, thus providing a new means for enterprises to obtain funds more easily, and a new financial product for investors, different from stocks and bonds, for earning profits through transactions, as well as a new market forming method that enables the bonds issued by the securities issuing system to be marketed.

The above intentions can be obtained by an embodiment of the present invention in which a securities issuing system has a server in a securities issuing institution, a client in a user institution, and a securities issuing machine at a securities issuing site.

In an embodiment of the invention the server includes a means for transmitting information an offer, indicating securities available to the client and a means for receiving a bid or an offer to purchase securities. The server also has software capable of market making or creating an authorization to issue securities based, in part, on the bids or offers to purchase securities received from the client. The server also has means for receiving individual user identification information and user institution identification information. The server is also capable transmitting and authorization including the individual user identification information and the authorization to issue securities to the securities issuing machine. The server also has means for receiving a confirmation of the issue of securities from the securities issuing machine, accumulating a total of the securities confirmed as issued and calculating fees to charge the user institutions.

The preferred embodiment of the invention, the client means for transmitting the bid or offer to purchase securities to the server identification information about both the individual user the user institution to the server.

The third component of the preferred embodiment of the invention is a securities issuing machine. This securities issuing machine includes means for receiving the authorization to issue securities from and the individual user identification information from the server. The securities issuing machine is also capable reading an individual user's reference identification information from a recording medium and then collating or checking that individual user identification information received from the server with the individual user reference identification read from the recording medium. The securities issuing machine then makes a decision base on that collation or check and, if appropriate issues the securities detailed in the authorization to issue securities received from the server to the user. The securities issuing machine then transmits the result or the conformation of the transaction back to the server.

In one embodiment of the invention, securities issued are bonds for obtaining funds from private sectors, which are issued by the securities issuing institution in order to promote investments of private funds into public works for improving infrastructures, carrying a wording that a trusted entity, such as but limited to, the Government of Japan, a public entity, or a private enterprise of Japanese nationality, as well as the national government of a foreign country, a public entity, or a private enterprise of foreign nationality, either singularly by one of them, or jointly by two or more of them, serves as a guarantor or guarantors within a predetermined limit for principal reimbursement and interest payment liabilities to be born by the securities issuing institution and that the public works for improving infrastructures are planned and executed by the trusted entity.

In a further embodiment of the invention, the securities issuing system includes securities issued for acquiring funds by a business operator in exchange for the certificates of securities, on which written are a dividend wording describing that the business operator will distribute profits obtained as a result of business activities to persons who own the certificates of securities, an interest wording describing that the business operator will pay interests periodically to the persons who own the certificates of securities and a warranty wording describing that one or more trusted entities serves as a guarantor or guarantors within a predetermined limit for principal reimbursement and interest payment liabilities to be born by the securities issuing institution in case the business operator becomes unable to pay the interests according to the interest payment wording due to reasons such as a business failure.

In another embodiment of the invention, the securities issuing institution is a private urban development organization.

A further embodiment of the invention includes a method for forming a new market capable of making a person who has never purchased securities purchase securities issued by using the system, and trade those securities in the market as needed.

The present invention provides a means of issuing bonds related to project financing, where projects are public works such as infrastructure improvement projects. A person who wishes to purchase such a bond is able to see the contents of the public works to which the person is investing. Since the person can select the public works at will, in which his/her money is to be invested, this method enhances his/her desires for purchasing the bonds. Moreover, since the person's investment will never be used in public works to which he/her objects, the investor can purchase bonds with more confidence.

The present invention provides a private enterprise trying to execute public works such as infrastructure improvement projects a means of acquiring large sums of funds from private sectors to be invested into the public works such as infrastructure improvement projects through bond issuing.

This is because those who are buying bonds can be assured for the repayment as the principal and interests repayment liabilities of the bond issuers are warranted to certain fixed limits by the Government of Japan, a public entity, or a private enterprise of Japanese nationality, either singularly by one of them, or jointly by two or more of them so that the bond buyers are guaranteed to be able to collect the principal and interests safely within certain fixed limits even when the a private enterprise fails in the operation of the public works.

Moreover, the present invention provides a means of preventing the Government of Japan, a public entity, or a private enterprise of Japanese nationality from wasting tax money, because the warrants for the bond issuers' principal and interest repayment liabilities by the Government of Japan, a public entity, or a private enterprise of Japanese nationality, as well as the government of a foreign country, or a public entity of foreign nationality, are limited to certain levels that are determined fairly by an independent public institution.

Thus, the Government of Japan, a public entity, or a private enterprise of Japanese nationality, as well as the government of a foreign country, or a public entity of foreign nationality are not obliged to bear the full amounts of the bond issuers' principal and interests repayment liabilities when the operations of public works such as infrastructure improvement projects by a private enterprise fail as in the case of government guaranteed bonds.

Moreover, since securities that are not bound by the concept of redemption dates can be issued according to the present invention, a business operator can operate without having to bear the burden of principal repayment realistically speaking.

The owner of the securities issued under the present invention is eligible for dividends. He/she can earn interests as well. Furthermore, the owner of the securities is guaranteed for the repayment of the principal of the funds provided to the business operator by the Government of Japan, a public entity, or a private enterprise of Japanese nationality, as well as the government of a foreign country, or a public entity of foreign nationality either singularly by one of them, or jointly by two or more of them within a predetermined limit, if the business operator who issued the securities becomes unable to pay interests in accordance with the interest wording due to bankruptcy or poor business.

The securities issued according to this invention are a new kind of financial product which did not exist before. This product encourages people who have never bought securities to buy securities. Therefore, the invention can create a new financial market.

According to the invention, user institutions can apply for securities purchases through their clients, so that securities buyers can buy securities from their homes and offices.

According to the invention, the clients of the present securities issuing system are installed in each user institution, so that it is easy to control the securities purchase status by each user institution, and various services can be offered by each user institution to attract customers.

A user institution here means a securities company, a bank, a private enterprise, or a general buyer of securities. According to this invention, the users of this securities issuing system can purchase the securities without having to have cash at hand as long as the users have ID recording media.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered with the accompanying drawings, in which like reference characters designate the same or similar parts throughout the several views, and wherein:

FIG. 10 shows a table of three kinds of fixed rate financing instruments of the invention including the one for an Odaiba Casino Project.

FIG. 11 shows a table of three kinds of fixed rate financing instruments of the invention including the one for a Japanese Highway Project.

FIG. 12 shows a table of two kinds of fixed rate financing instruments of the invention.

DETAILED DESCRIPTION OF THE PREFERRED EMBODIMENTS

FIGS. 10-12 show examples of the fixed rate financing instruments which offer a dividend or are partially guaranteed by a third party to issuance as disclosed in U.S. patent application Ser. No. 11/148,406 filed on Jun. 9, 2005, which is incorporated herein by reference.

The fixed rate financing instrument has at least one issuing legal entity specified thereon which issues the financing instrument as evidence of debt to acquire finds to finance at least one operation, a face value specified thereon to be paid to the issuing legal entity in exchange for owning the financing instrument, a fixed interest rate specified thereon defining periodical interest payments to an instrument holder as a percentage of the face value, and at least one of (1) a guarantee ratio g being defined as a percentage of the interest payments and the face value to be paid back to the instrument holder as committed by at least one third party to issuance, if the legal entity defaults, $0<g<100$, and (2) at least one of a fixed-rate dividend d and a fixed-amount dividend to be paid to the instrument holder after an operation financed through the financing instrument starts making profits, the fixed-rate dividend d being defined as a percentage of the profits to be paid to the instrument holder periodically, $0<d<100$.

The security is a note, a stock, a treasury stock, a bond, a debenture, a certificate of interest or participation in a profit-sharing agreement or in oil, gas, or mineral royalty or lease, a collateral trust certificate, a pre-organization certificate or subscription, a transferable share, an investment contract, a voting-trust certificate, a certificate of deposit, for a security, a put, call, straddle, option, or privilege on a security, certificate of deposit, or group or index of securities, or a put, call, straddle, option, or privilege entered into on a national securities exchange relating to foreign currency, or an instrument commonly known as a 'security'; or a certificate of interest or participation in, temporary or interim certificate for, receipt for, or warrant or right to subscribe to or purchase, any of the foregoing; but shall not include currency or any note, draft, bill of exchange, or banker's acceptance which has a maturity at the time of issuance of not exceeding nine months, exclusive of days of grace, or any renewal thereof the maturity of which is likewise limited.

Figure 1:
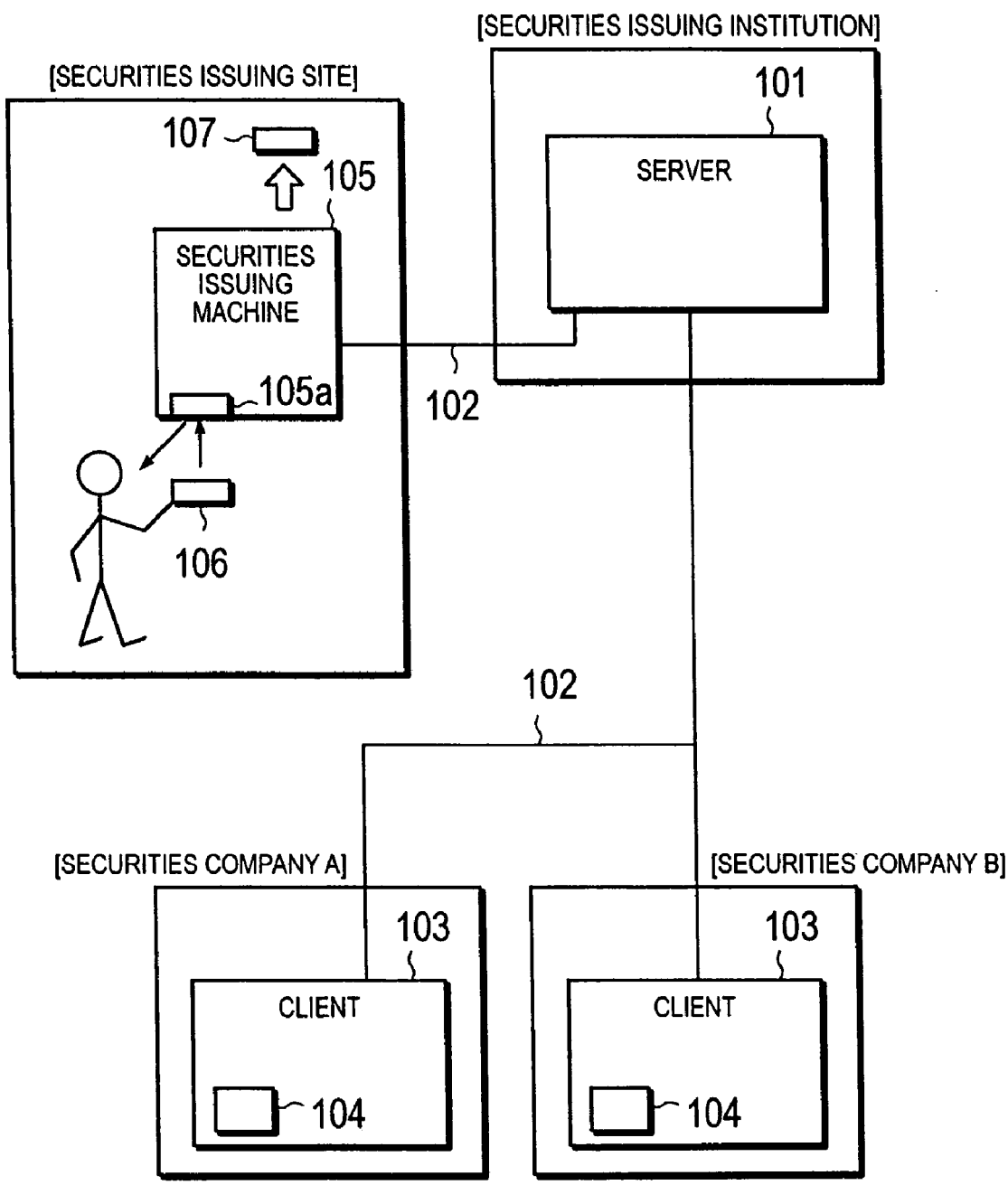
FIG. 1 is a diagram showing a securities issuing system according to a preferred embodiment of the present invention.

FIG. 1 is a securities and financing instruments issuing system according to one embodiment of the invention. As shown in FIG. 1, the securities issuing system according to this embodiment is equipped with: a server 101 in a securities issuing institution, which may be an underwriter or a private corporation (including a private enterprise responsible for executing a public work project), that issues securities (including the unique fixed rate financing instruments, for example, as shown in FIGS. 10-12) based on bids or securities purchase offers; a client device 103 in each user institution (including securities brokerage companies, banks, credit card companies, PayPal®, or any financial institutes that keep accounts of the general public), which is connected to the server via a communications link 102 such as, but not limited to a telephone line or a wireless link; a securities issuing machine 105, which may be located in each securities issuing site and which is connected to the server 101 via a communications line 102; and an identification (ID) recording media 106.

When the issuing institution is a private corporation (may be a privately-owned or publicly-traded company), newly-issued securities, such as stocks, bonds, or the unique fixed rate financing instruments, may be issued without using any underwriter or underwriting syndicate, as long as the issuing process satisfies the legal requirements in one respective country enforced by a governing body that oversees exchange of fixed rate financing instruments for review or registration as required by law, such as SEC in the US. Such offers to sell cannot be made before a registration statement has been filed with the SEC, and the offers can not be accepted until a registration statement becomes effective. After a registration statement is declared effective, sales literature can not be delivered unless accompanied or preceded by a final statutory prospectus, etc. According to the invention, a potential purchaser (an institutional investor or a member of the general public) can go to a standing-alone issuing machine to view prospectus and to offer to purchase and/or to purchase the newly-issued securities and financing instruments. Alternatively, the potential purchaser may offer to purchase or purchase the newly-issued securities and financing instruments via a physical site of an financial institution as described below. As such, the invention provides new market mechanisms which allow people to trade securities and fixed rate financing instruments more conveniently.

The client device 103 can be realized by a computer such as but not limited to a general-purpose computer, a dedicated terminal, an office computer, or a personal computer.

Dedicated securities purchase offer software 104 as well as various other kinds of application software are installed on the client device 103.

When the securities purchase offer software 104 is activated, the client device 103 is enabled to communicate with the server 101 and send securities purchase offers or bids to the server 101. The securities purchase offer software 104 may for instance, be lent or licensed by the security issuing institution to each user institution free of charge and is set up in such a way as to make securities purchase offers easier and smoother.

The client device 103 with its securities purchase offer software 104 running transmits information concerning the securities to be purchased and ID information concerning user individuals and the user institution to the server 101 in order to make securities purchase offers easier and smoother. This function of the client device 103 may be termed the bid or purchase request function.

The ID information concerning user individuals and the user institution transmitted from the client device 103 to the server 101 at the time of bidding for or requesting securities purchase is stored in an ID recording medium 106 as the individual user identification (ID) reference information. Although the ID recording medium 106 used in this embodiment is an ID card, the mode of the invention is not limited to it. The individual user identification (ID) reference information may be printed in any suitable form such as, but limited to, text, 2D or 3D bar codes, graphic codes, water marks, visual bio-identification photographs, signatures and/or finger or thumb prints, digitized voices, hand prints, finger/thumb prints, or retinal (eye) images, etc. on a card or a storage medium. The individual user identification (ID) reference information may be carried by any suitable form such as, but limited to, a paper or plastic card, a magnetic strip (e.g., on a debt or credit card), a magnetic disk or tape, an electronic chip (e.g., on a credit or smart card), a personal digital assistant or a cell phone memory, or memory in other portable, hand-held, or palmtop devices, etc. The electronic personal data or bio-identification data can be verified by sampling on-site or retrieved from the storage medium to compare with a on-site or on-line database.

In the meantime, the server 101 of the securities issuing institution's purchase request accepting function establishes a securities purchase offer based on the securities purchase offer received from the client device 103. The securities purchase offer is an authorization to issue securities. For example, the server 101 searches a database to see if there are any unsold securities of the particular securities based on the securities information received from the client device 103. If the server ascertains that there are unsold securities matching the bid specifications, the server establishes the securities purchase offer or authorization to issue shares immediately. If there are no securities of the type specified in the client bid information, the server notifies the client device 103 that there are no securities to be sold.

It is so set up that the securities purchase offer, or authorization to issue securities, will not be established even if there are unsold securities are available if the ID information from the client device 103 was not properly transmitted.

When a securities purchase offer or authorization to issue securities is established, the server 101's wait instruction function transmits the or authorization to issue securities purchase information concerning the deal as well as the ID information concerning the securities purchase offer to the securities issuing machine 105 at the securities issuing site.

In one embodiment, the securities issuing machine 105 at the securities issuing site has an slot 105a for inserting, inputting or otherwise connecting, the ID recording medium 106. The issuing machine 105 is, by means of an ID reading function, also capable of reading the user's ID reference information recorded on the ID recording medium when the ID recording medium 106 is inserted, input or otherwise connected into the slot. The issuing machine 105 may be as automated as an automatic teller machine (ATM) so as to print and dispense a fixed rate financing instrument directly to a purchaser. Alternatively, the purchaser may designate a depository, such as a security breakage company or the like which the purchaser has a account with. In one embodiment of the invention, the issuing machine 105 also functions as an automatic teller machine (ATM) or other kiosks, such as paying routine bills, fees, and taxes (utilities, phone bills, social security, legal fees, taxes, etc.), loading monetary value into pre-paid cards (cell phones, tolls), conducting ticketing transactions (train, concert, etc.). The issuing machine 105 may have custom circuit boards or using a computer with special software running on operating systems such as Windows, Linux, etc.

The issuing machine 105 then, in a collating function, collates the user's ID reference information read from the medium with the ID information received from the server. In-store issuing machine 105 may have its cryptoprocessor connected directly to the internet or other network, or via a modem over a dedicated telephone line then to the internet so as to connect to the server. The secure crypto processor is generally within a computer in a secure enclosure. The security of the issuing machine 105 relies on the integrity of the secure cryptoprocessor.

If appropriate, the issuing machine 105 then, by means of an issuing function, (1) prompts a pop-up screen for users to click-through to indicate whether they are located within a jurisdiction where the offering has been registered or is exempt from registration, or the site may be password-protected for investors who have otherwise been screened and given passwords, (2) prompts a pop-up screen for users to click-through to consent to electronic delivery/display a statutory prospectus, and to acknowledge that they have electronically received/reviewed the statutory prospectus, and then (3) issues the securities 107 based on the corresponding securities purchase offer information. The issuing machine 105 also prompts a statement that paper copies of the prospectus and other required SEC documents are available upon request from an identified contact. The issuing machine 105 also has an issue result transmitting function which is used to transmit confirmation of the securities issue to the server 101 as the security issue result information or confirmation.

Optionally, the server 101 and the issuing machine 105 supports real-time pricing for newly-issued securities on-line to the public based upon the offers to purchase and offers to sell available real-time, rather than traded on a regular, periodic basis, such as weekly, semi-weekly, or daily like in the current bond market.

Outdoor issuing machines 105 may be free-standing, like a kiosk, or built into the side of a building of financing entities, such as security brokerage companies, banks, post offices, etc. The issuing machines 105 placed at or inside locations such as malls, grocery stores, and restaurants. These entities may charge a processing fee for the arrangement. The security features of the issuing machines 105 include invulnerable physical structures, effectively safe dispensing mechanisms, etc. Additional security mechanisms known to one skilled in the art are installed for the outdoor issuing machines 105.

The issuing result or confirmation information of the securities 107 transmitted from the securities issuing machine 105 to the server 101 is accumulated on the database in the server 101 by means of an information accumulating function.

The server 101 of the securities issuing institution can further calculate the fees based on the accumulated issuing result information (post-issue settling function).

Let us now describe the operation of the embodiment constituted above. In the securities issuing system using ID information according to this embodiment, the client device 103 of each user institution is activated and operated by the operator to run the securities purchase offer software 104 installed in the client device 103. As the securities purchase offer software 104 is activated, the client device 103 is enabled to communicate with the server 101 of the securities issuing institution.

Next, the operator enters information concerning the securities desired to be purchased, enters into the client device 103 the user's individual ID information and the ID information concerning the user institution, which will in turn be transmitted from the client device 103 to the server 101 of the securities issuing institution in order to present the securities purchase offer or bid to the server 101 of the securities issuing institution.

The user's individual ID information and the ID information concerning the user institution to be transmitted to the server 101 of the securities issuing institution are the same as the information stored in the ID recording medium 106 as the user's ID reference information.

Upon receiving the securities purchase offer or bid from the client device 103, the server 101 of the securities issuing institution, in a market making operation, searches a database to see if there are any unsold securities of the particular securities based on the information from the client device 103. If there are unsold securities, a securities purchase offer is immediately established. Otherwise the client device 103 is notified that there are no securities matching the bid. The securities purchase offer will not be established even if there are unsold securities are available if the ID information from client device 103 was not properly transmitted.

When a securities purchase offer or authorization is established, the server 101 transmits the securities purchase information or authorization concerning the deal, as well as the appropriate ID information, to the securities issuing machine 105 provided in the securities issuing site. This completes the securities purchase offer or authorization procedure.

The user who made a securities purchase offer or bid goes to the securities issuing site with the ID recording medium 106 that stores the ID reference information. The user puts the ID recording medium 106 into the slot 105a of the securities issuing machine 105 of the securities issuing institution located at the securities issuing site.

The securities issuing machine 105 reads the information from ID recording medium 106, and collates the user's ID reference information read from the medium with the ID information received from the server 101, and issues the securities 107 based on the corresponding securities purchase offer information based on the collation result.

The securities issuing machine 105 further transmits confirmation of the securities issue to the server 101 as the security issue result or conformation information. The issuing result information of the securities 107 transmitted from the securities issuing machine 105 to the server 101 is accumulated on the database in the server 101.

The server 101 of the securities issuing institution can further calculate the fees based on the accumulated issuing result information as well as calculate the fees for each user institution's client device 103 or each user institution.

As can be seen from the above, since the client device 103 is installed at each user institution, each user institution can more easily manage its securities purchasing status. In particular, as the client device 103 can start up various other types of application software on its own, a wide range of applications, for example, causing the accounting application to read the securities purchase status data, are possible.

On the other hand, the securities issuing institution can provide various services for each user institution depending on this mode of the embodiment. For example, it is possible to arrange a post-issue lump sum settling based on the securities issuing result information or provide discount service depending on the number of securities issued for each user institution. This makes it possible for the securities issuing institution to monopolize, practically speaking, each user institution's securities purchase needs.

Also, according to this embodiment, processes within the institution such as charging forward and its registration become unnecessary as the fee settling procedures are done for the user institutions.

The client device 103 has various functions related to the securities purchase offer such as the collating function for the securities purchase offers. Moreover, it is possible to arrange various services from the securities issuing institution to be transmitted from the server 101 of the securities issuing institution to the client device 103.

Although the client device 103 transmits the ID information of each user institution and the individual user in the user institution directly to the securities issuing institution in this embodiment, the invention is not limited to that mode.

In an alternate embodiment of the invention, the client device 103 may also present a securities purchase offer or bid by transmitting the ID information indirectly to the issuing institution by presenting a bid displaying or including ID information to the Bank of Japan or a financial institution. In this event, the Bank of Japan or the financial institution transmits the ID information from the client device 103 to the securities issuing institution.

Figure 2:
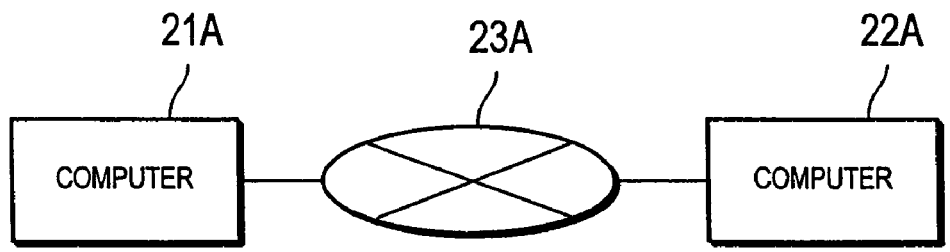
FIG. 2 is a block diagram of the overall structure of an embodiment of the present invention.

FIG. 2 is a block diagram showing the entire structure of the securities information offering system according to the second embodiment of the present invention. The securities information offering system according to this embodiment comprises a computer 21A installed at a securities company and a computer 22A owned by an investor, which are interconnected communicably via a network 23A. The number and type of the devices connected to the network 23A are not limited by the example shown in FIG. 2.

Figure 3:
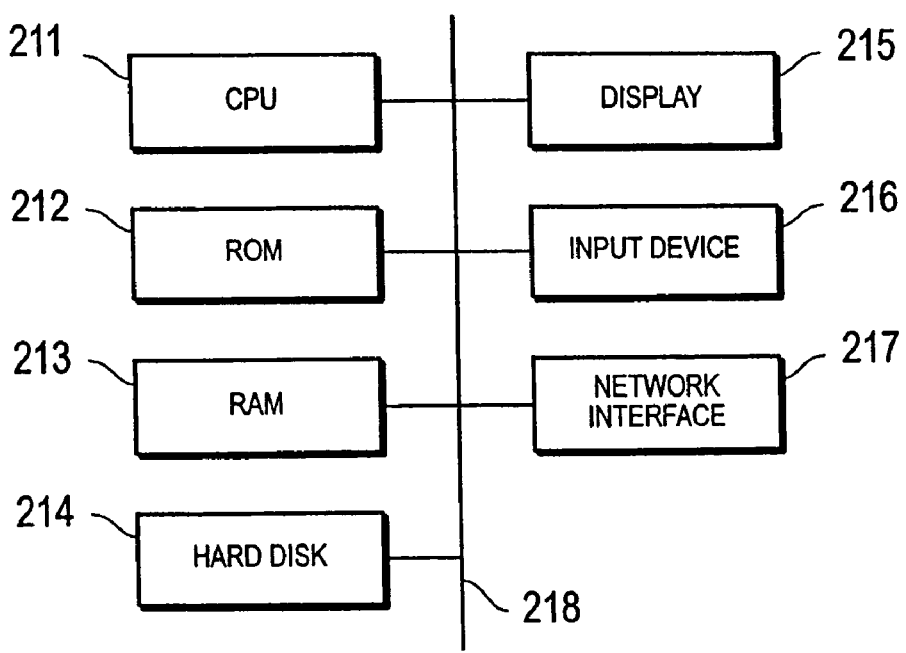
FIG. 3 is a block diagram showing greater detail of the computers depicted in FIG. 2.

FIG. 3 is a block diagram showing the constitution of the computers 21A and 22A according to this embodiment. With reference to FIG. 3, the computers 21A and 22A each has a CPU 21 for conducting various control and arithmetic processes, a ROM 212 for storing various programs and data, a RAM 213 for temporarily storing data as a working area, a hard disk 214 for storing various programs and data, a display 215 for conducting various displays, an input device 216 such as a keyboard and a mouse for conducting various inputs, a network interface 217 for communicating with other devices on the network, and others, all of which area interconnected via a bus 218 for exchanging signals.

The network 23A can be a public network such as a telephone network, a mobile communication network, an ISDN and a packet exchange network, or a computer network such as a LAN, a WAN and the Internet.

Figure 4:
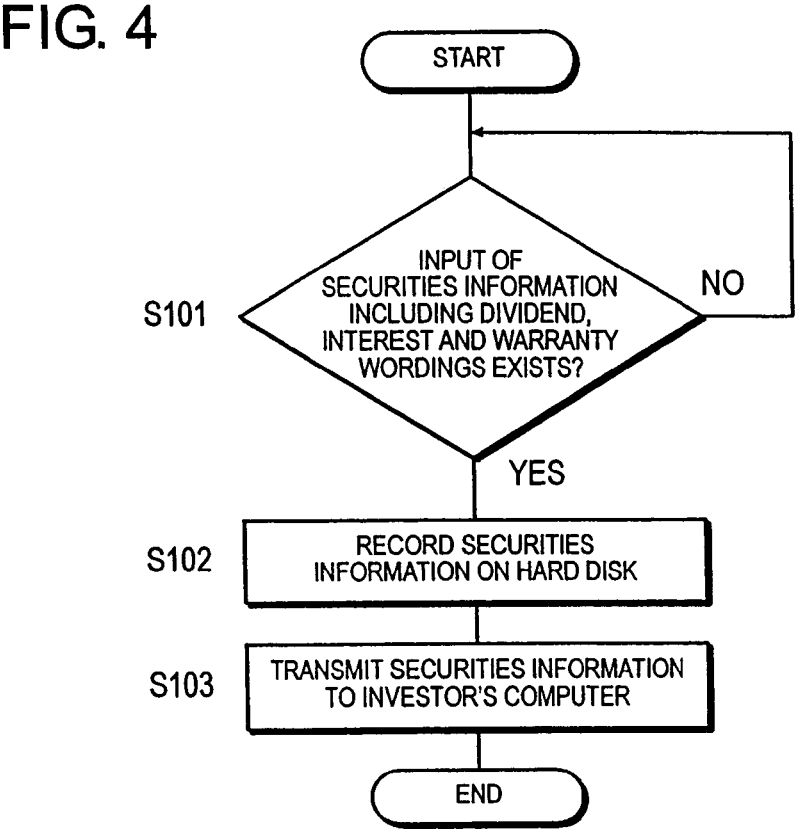
FIG. 4 is a flowchart representing a segment of a program executed by the securities company's computer according to the embodiment depicted in FIG. 3.
Figure 5:
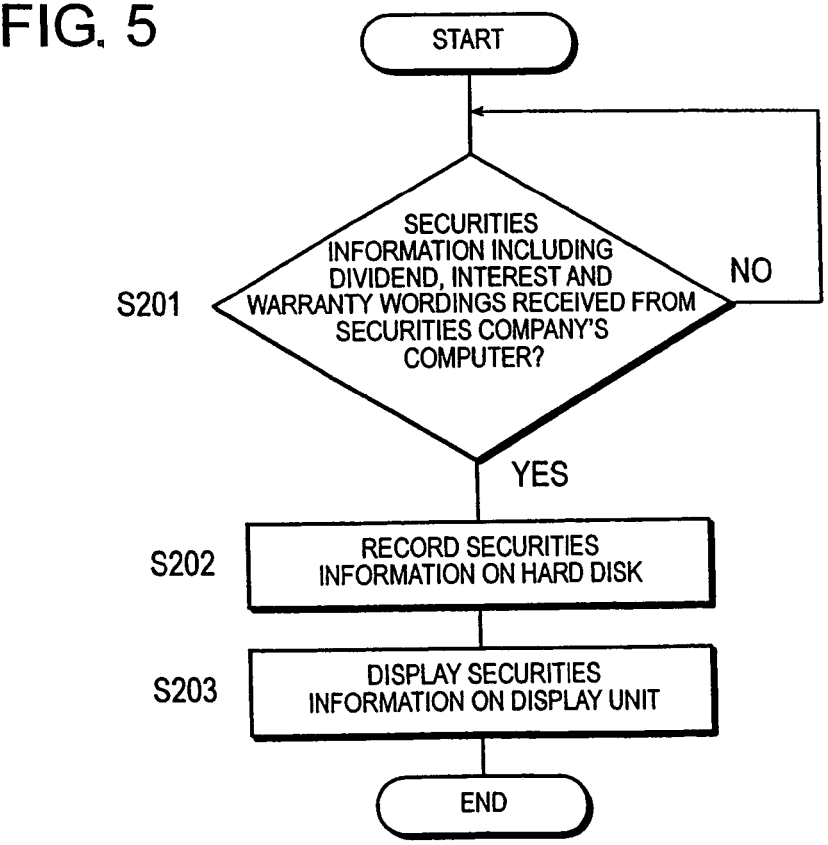
FIG. 5 is a flowchart representing a segment of a program executed by the investor's computer according to the embodiment depicted in FIG. 3.

Next, the outline of the operation of the securities information offering system according to this embodiment will be described. FIG. 4 and FIG. 5 are the flowcharts of the procedures of the securities information offering processes of the computers 21A and 22A. The algorithms shown as the flowcharts of FIG. 4 and FIG. 5 are stored as the control programs in either the ROM 212 or the hard disk 214 of the computers 21A and 22A respectively, and are executed by the CPU 21.

In FIG. 4, the computer 21A installed in the securities company waits for securities information including the dividend wording 3, the interest wording 4, and the warranty wording 5 to be entered (S101: No). The operator at the securities company enters into the computer 21A via the input device 216 the dividend wording 3, the interest wording 4, and the warranty wording 5 for a specific securities similar to the one shown in the first embodiment, as well as other securities information, e.g., a wording 1 concerning the title, and a wording 2 concerning the face value and other information relaying to the securities certificate.

When the computer 21A receives the securities information including the dividend wording 3, the interest wording 4, and the warranty wording 5 (S101: Yes), it records the entered securities information into the hard disk 214 (S102), and transmits the securities information to the computer owned by the investor 22A via the network interface 217 and the network 23A (S103). The procedure of the transmission of the securities information in the step S103 can be automatically done according to the securities information input procedure in the step S101, or can be performed upon receiving the transmission request from the computer 22A owned by the investor.

In FIG. 5, upon receiving the securities information including the dividend wording 3, the interest wording 4, and the warranty wording 5 from the computer 21A owned by the investor via the network 23A and the network interface 217 (S201), the computer 22A stores the received information into the hard disk 214 (S202), and displays the same on the display unit 215 (S203).

In this embodiment, the investor can confirm the contents of the securities according to the present information from his/her office or home and instantaneously purchase any desired securities through on-line procedures using the computer 22A. Moreover, the securities company can advertise and sell simultaneously the securities according to the invention through the network alone.

Figure 6:
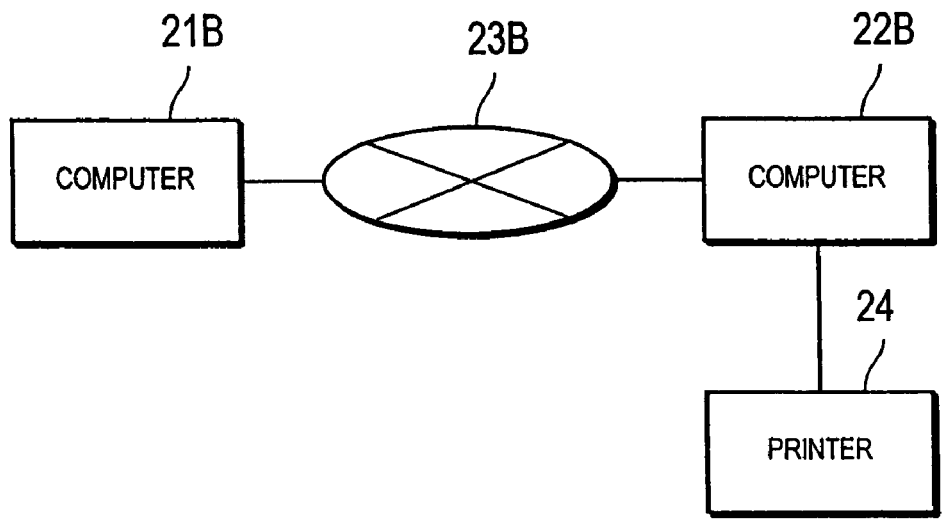
FIG. 6 is a block diagram of the overall structure of an alternative embodiment of the present invention.

FIG. 6 is a block diagram showing the entire structure of the securities information offering system according to the third embodiment of the present invention. The securities information offering system according to this embodiment comprises, similar to the case of the securities information offering system according to the aforementioned second embodiment, a computer 21B installed at a securities company and a computer 22B owned by an investor, which are interconnected communicably via a network 23B, while a printer 24 is connected to the computer 22B.

The computers 21B and 22B of this embodiment have constitutions similar to those of the computers 21A and 22A of the second embodiment.

Figure 7:
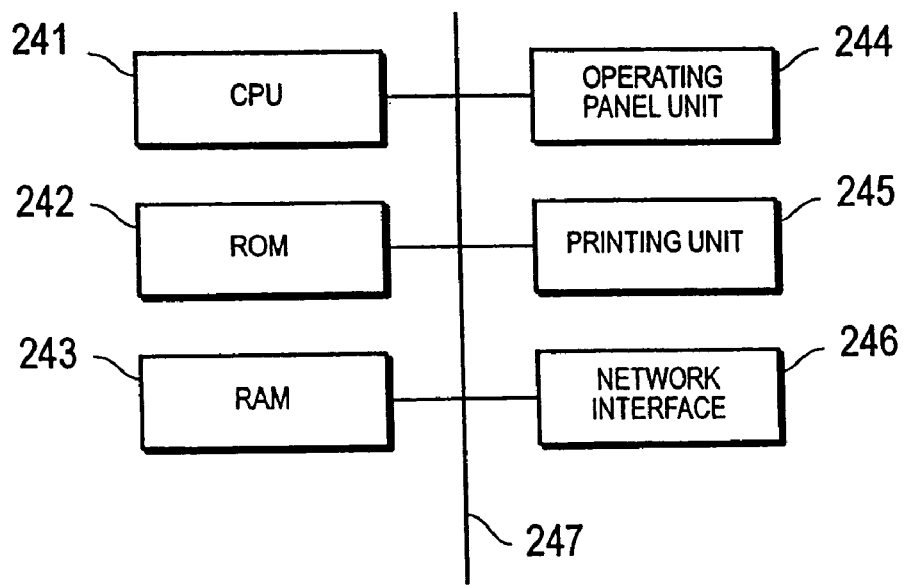
FIG. 7 is a block diagram showing greater detail of the printer depicted in FIG. 6.

FIG. 7 is a block diagram showing the constitution of the printer 24 according to this embodiment. With reference to FIG. 7, the printer 24 has, in addition to a CPU 241, a ROM 242, a RAM 243, a network interface 246, and a bus 247, an operating panel 244 consisting of a touch panel for various inputs and displays, fixed keys, display lamps, etc., and a printing unit 245 for printing image data.

Figure 8:
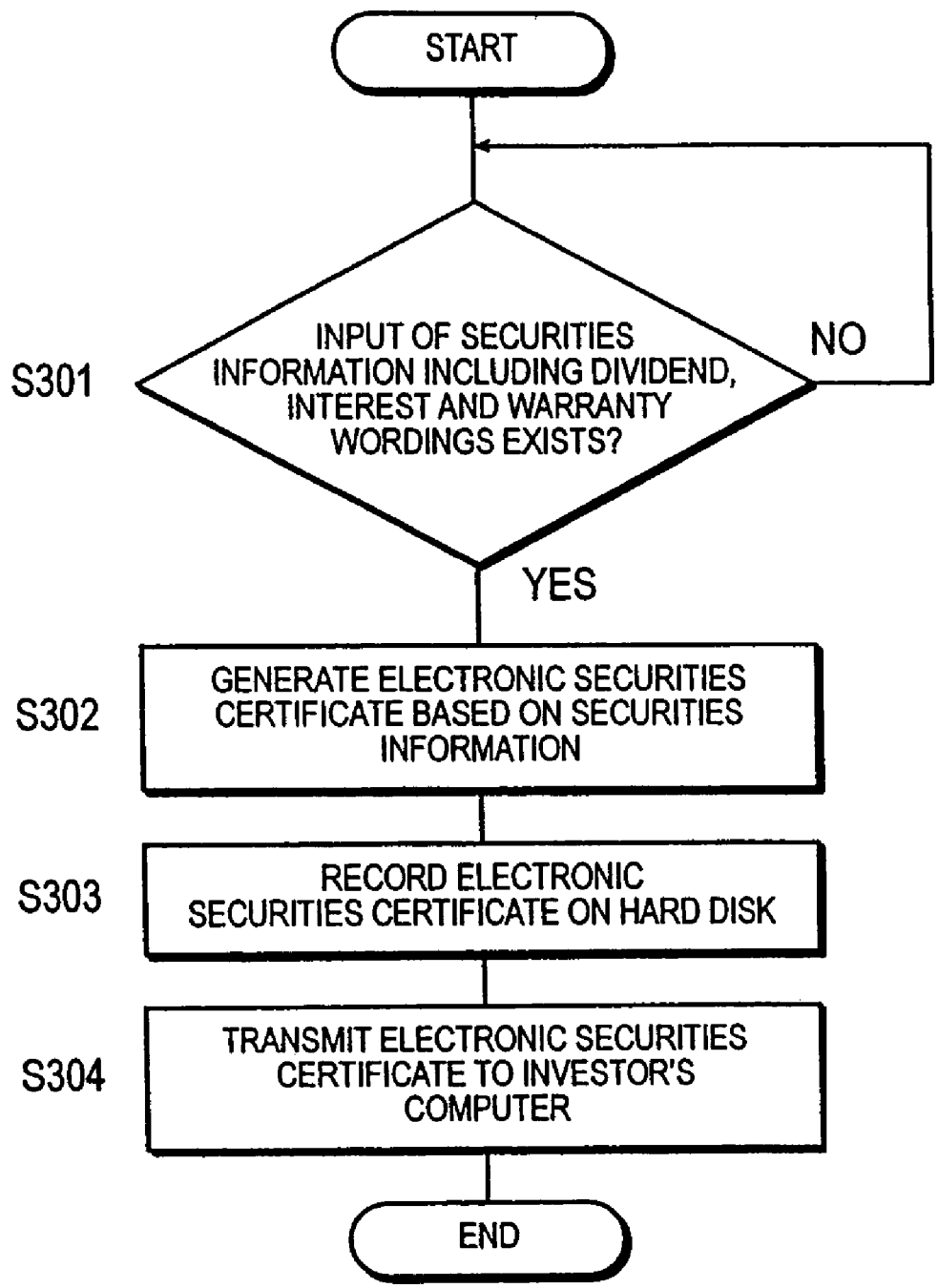
FIG. 8 is a flowchart representing a segment of a program executed by the securities company's computer according to the embodiment depicted in FIG. 6.
Figure 9:
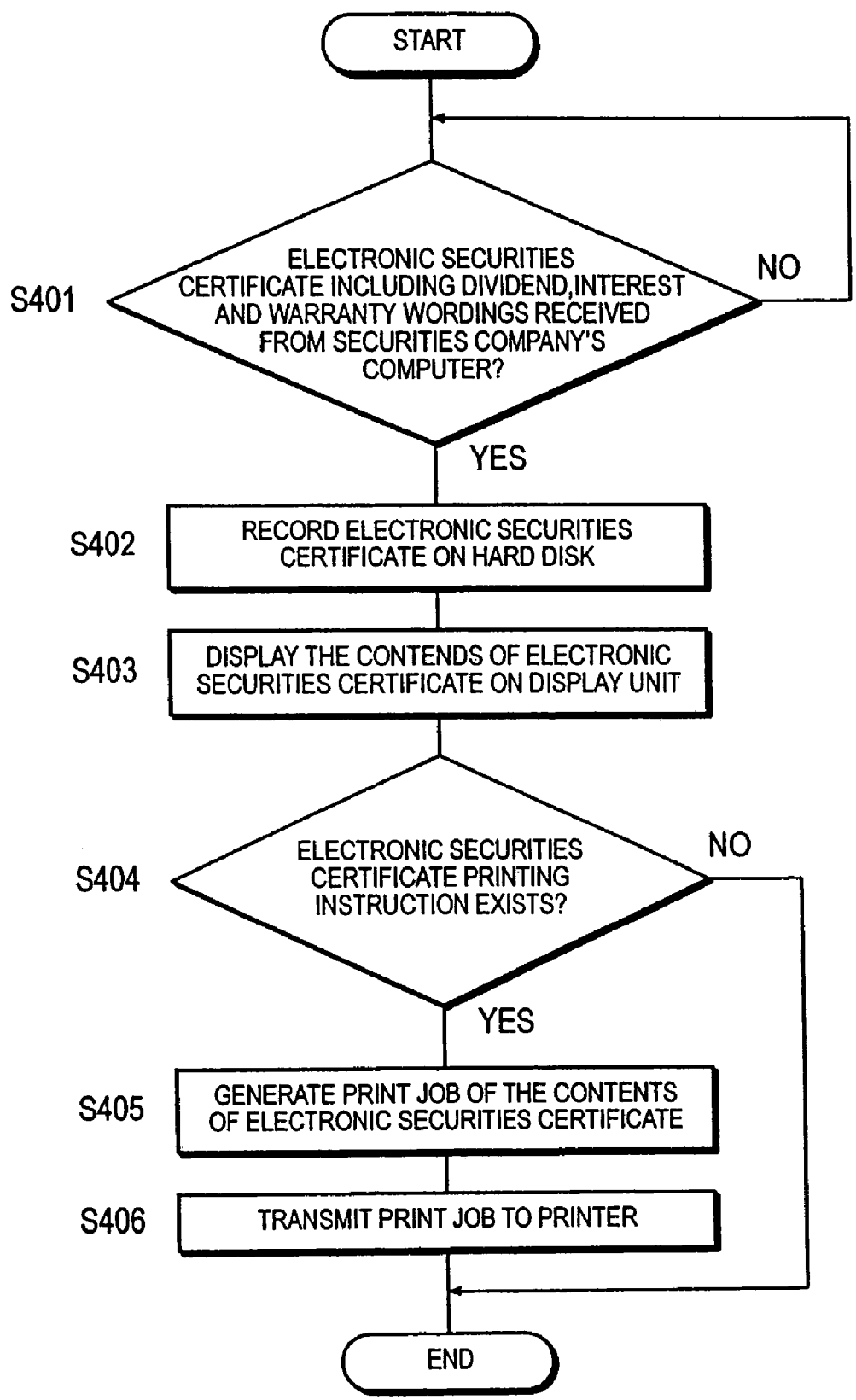
FIG. 9 is a flowchart representing a segment of a program executed by the investor's computer according to the embodiment depicted in FIG. 6.

FIG. 8 and FIG. 9 are the flowcharts showing the procedures of the securities issuing processes in the computers 21B and 22B in this embodiment. The algorithms shown as the flowcharts of FIG. 8 and FIG. 9 are stored as the control programs in either the ROM 212 or the hard disk 214 of the computers 21B and 22B respectively, and are executed by the CPU 21.

In FIG. 8, the computer 21B installed in the securities company waits for securities information including the dividend wording 3, the interest wording 4, and the warranty wording 5 to be entered (S301: No). The operator at the securities company enters into the computer 21B via the input device 216 the dividend wording 3, the interest wording 4, and the warranty wording 5 for a specific securities as well as other securities information as indicated in the aforementioned first embodiment.

When the computer 21B receives the securities information including the dividend wording 3, the interest wording 4, and the warranty wording 5 (S301: Yes), it generates an electronic securities certificate based on the received securities information (S302). The electronic securities certificate mentioned here is a version based on electronic data of the securities certificate shown in the first embodiment (FIG. 1), and contains the wording 1 for the title of the securities, the wording 2 for the face value, the dividend wording 3, the interest wording 4, and the warranty wording 5 for the specific securities as well as the electronic signature of the securities issuer (business operator) for guarantying the legitimacy of the securities certificate. Moreover, such an electronic securities certificate is provided with a specified copy protection for the purpose of preventing illegal modification or copying. The computer 21B records the generated electronic securities certificate in the hard disk 214 (S303), and transmits simultaneously the electronic securities certificate to the computer 22B owned by the investor via the network interface 217 and the network 23B (S304). The procedure of the transmission of the securities information in the step S304 can be automatically done according to the securities information input procedure in the step S302, or can be performed upon receiving the transmission request from the computer 22B owned by the investor.

In FIG. 9, upon receiving the electronic securities certificate including the dividend wording 3, the interest wording 4, and the warranty wording 5 from the computer 21B owned by the investor via the network 23B and the network interface 217 (S401), the computer 22B stores the received electronic securities certificate into the hard disk 214 (S402), and displays its contents on the display unit 215 (S403).

In this embodiment, the electronic securities certificate can be circulated through the network as the original of the securities certificate, so that the investor can purchase the contents of the securities according to the present information from his/her office or home and instantaneously obtain the certificate of any desired securities through on-line procedures using the computer 22B. Moreover, the securities company can sell the securities according to the invention through the network alone and is freed from the burden of mailing the securities certificate later.

Further, the computer 22B can be a type which prints out the contents of the electronic securities certificate by means of the printer 24, in addition to or instead of displaying them on its display unit. In other words, it is possible to provide the electronic securities with a protection electronically so that it can be printed only once, so that the only one copy of the securities certificate can be printed and circulated through the market as its original. In this case, with reference to FIG. 9, the computer 22B waits for the printing instruction of the electronic securities certificate (S404), generates a print job of the contents of the electronic securities certificate recorded on the hard disk 214 (S405), and transmits the print job to the printer 24 (S406). The printing output protection applied on the electronic securities certificate as mentioned above does not have to be a type that limits the printing to only once, but can be a multiple print type or a no-limit type (i.e., no protection).

investors can purchase the new financial products of the present invention that are neither stocks nor bonds, and seek profits in a new financial market that did not exist before, while business operators can obtain funds using these securities that are neither stocks nor bonds. The financial instruments according to the present invention will dig up latent private funds in private sectors to be invested into public works. Therefore, the present invention will help the national as well as local governments of various countries of the world to improve infrastructures such as roads and healthcare facilities even under a tight financial condition.

The invention provides a method for forming a new market by providing a server and a plurality of issuing machines connected to the server via a network.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for forming a new market for a newly-issued security or fixed rate financing instrument comprising:

issuing the security as a stock or a bond, or issuing the fixed rate financing instrument printed thereon:

at least one issuing legal entity specified thereon which issues the financing instrument as evidence of debt to acquire funds to finance at least one operation;

a face value specified thereon to be paid to said issuing legal entity in exchange for owning the financing instrument;

a fixed interest rate specified thereon defining periodical interest payments to an instrument holder as a percentage of the face value; and at least one of (1) a guarantee ratio g being defined as a percentage of the interest payments and the face value to be paid back to the instrument holder as committed by at least one third party to issuance, if said legal entity defaults, 0<g<100, (2) a fixed-rate dividend d to be paid to the instrument holder after an operation financed through said financing instrument starts making profits, said fixed-rate dividend d being defined as a percentage of said profits to be paid to the instrument holder periodically, 0<d<100, and (3) a fixed-amount dividend being more than 0 and to be paid to the instrument holder after an operation financed through said financing instrument starts making profits;

providing a server and a plurality of issuing machines connected to the server via a network; and placing the plurality of issuing machines at locations accessible to the public;

receiving an identification (ID) recording medium provided by a potential purchaser by one of the issuing machines;

retrieving an identification recorded in the received ID recording medium by said one of the issuing machines;

requesting the potential purchaser to input request for a transaction of the security or fixed rate financing instrument by said one of the issuing machines; and processing the requested transaction by said one of the issuing machines by retrieving information via a network from the server; and printing out by said one of the issuing machines a hardcopy of the security or fixed rate financing instrument as purchased by the potential purchaser.

2. The method for forming a new market according to claim 1, further comprising notifying a depository designated by the potential purchaser the security or fixed rate financing instrument as purchased by the potential purchaser shall be deposited with the depository.

3. The method for forming a new market according to claim 2, wherein the notification is forwarded along with authorization for printing out a hardcopy of the security or fixed rate financing instrument as purchased by the potential purchaser.

* * * * *